Dec. 26, 1961  G. J. CIZEK  3,014,329
MOWING MACHINE AND CONTROLS THEREFOR
Filed Aug. 13, 1958  2 Sheets-Sheet 1
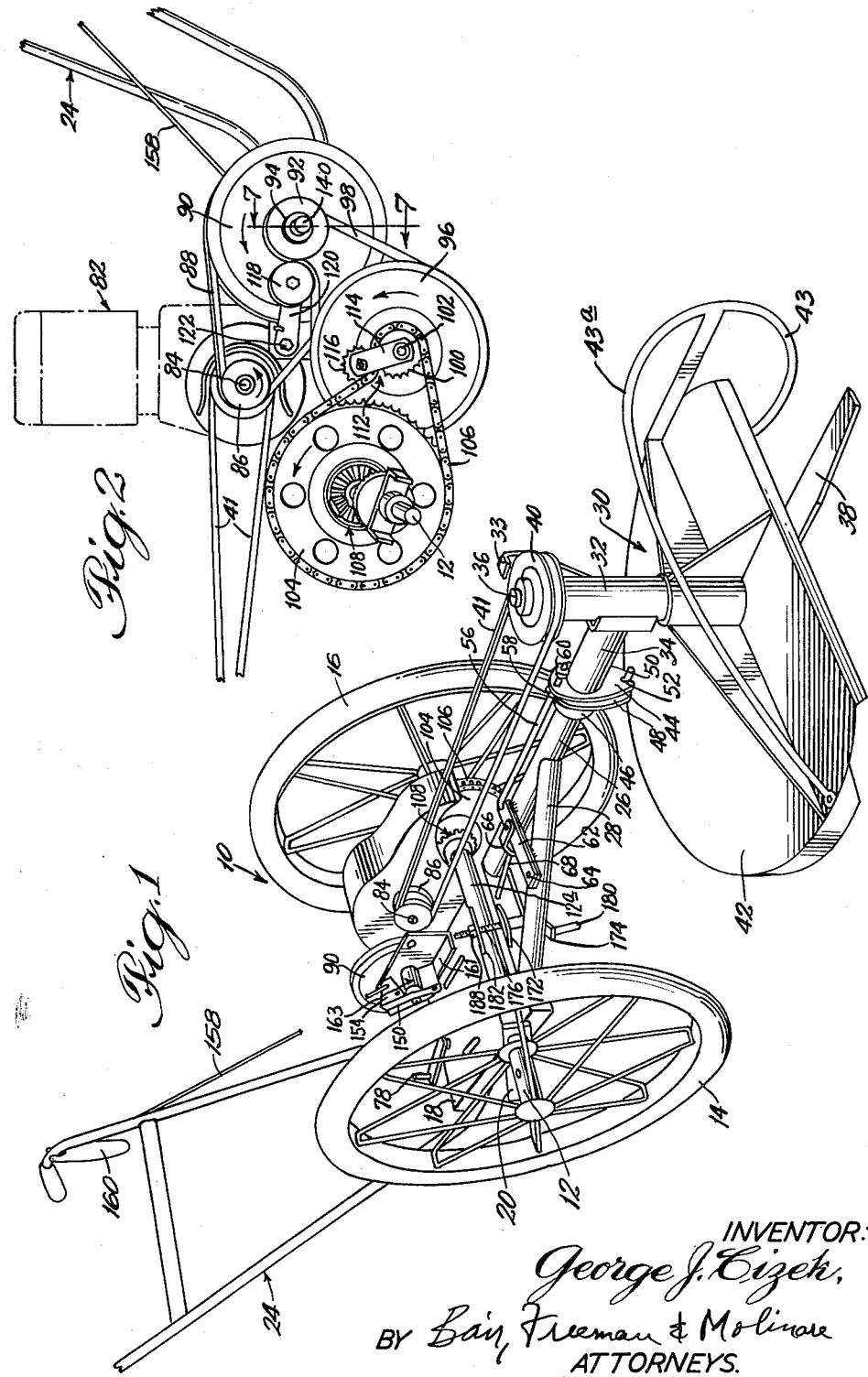
INVENTOR:
George J. Cizek,
BY Bair, Freeman & Molinare
ATTORNEYS.

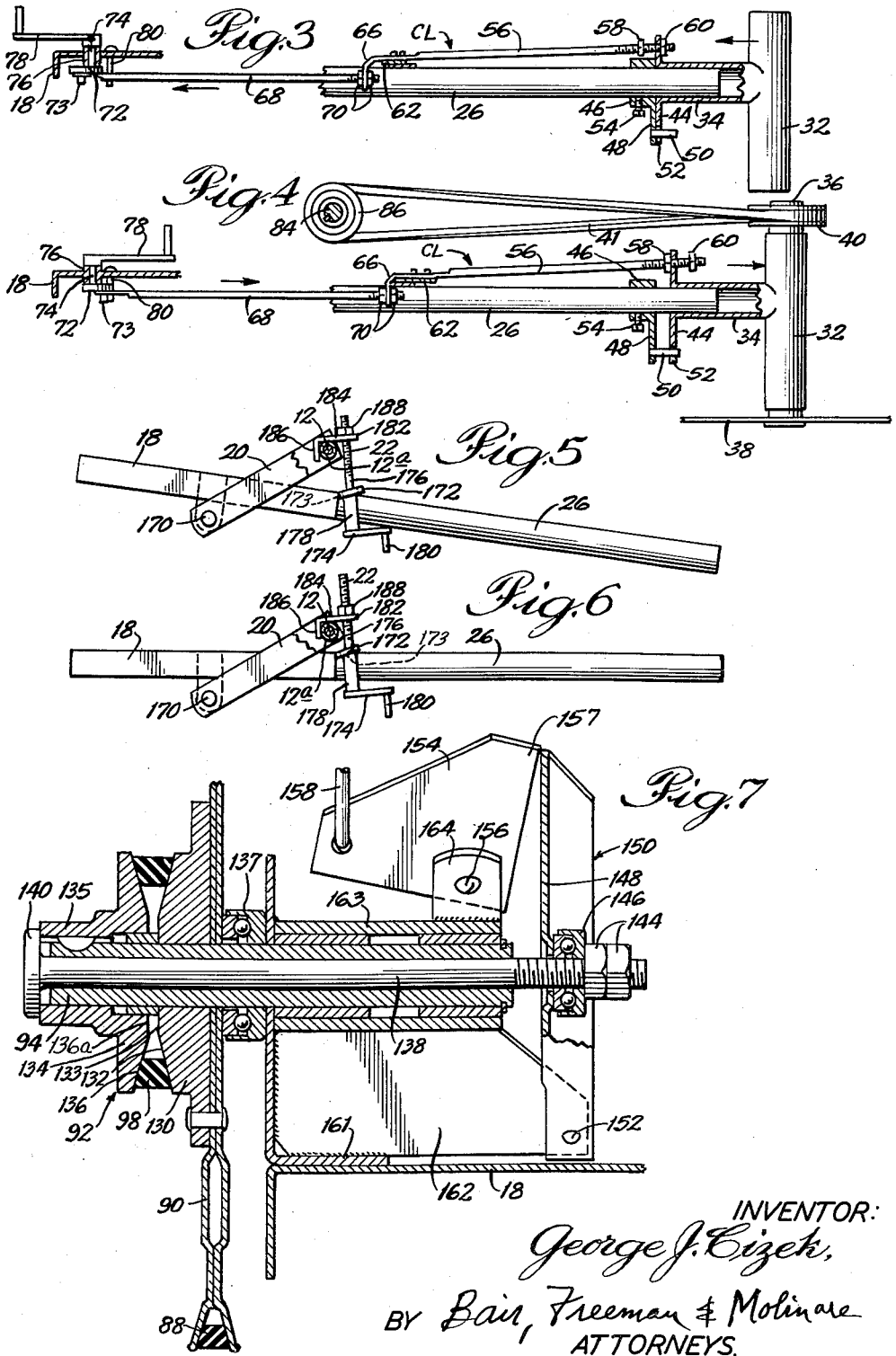

United States Patent Office 3,014,329
Patented Dec. 26, 1961

3,014,329
MOWING MACHINE AND CONTROLS
THEREFOR
George J. Cizek, Clutier, Iowa
Filed Aug. 13, 1958, Ser. No. 754,787
2 Claims. (Cl. 56—25.4)

This invention relates to improvements in mowing machines, and more particularly relates to controls therefor.

Mowing machines of the type having a blade rotatable about a substantially vertical axis have recently become very popular. The present invention is directed to particular controls for such a mower. Mowers of the type having blades which are rotatable about an upright axis have heretofore been produced with the cutter head either fixed relative to a wheel-supported frame or floating (rotatable about a horizontal axis) relative to the wheel-supported frame. In all such machines the cutter is normally continuously driven by a belt means.

One object of this invention is to provide such a mower wherein the cutter may be selectively disconnected from the belt drive means therefor.

Another object of this invention is to provide a mowing machine of the type disclosed wherein the cutter may be selectively disconnected from the belt drive means therefor, and wherein the cutter head may be selectively arranged either to be fixed or floating relative to the wheel-supported frame with which it is associated.

Mowers of the type having blades which are rotatable about a vertical axis and which have adjustable means for varying the pitch of the cutter blades are old in the art, as shown in Noel 2,114,096. The instant invention is directed, in part, to an improved and simplified means for varying the pitch of cutter blades of a mower wherein the cutter blades are rotatable about a vertical axis.

Thus, another object of this invention is to provide a simplified means for selectively varying the pitch of the cutter blades of a mower, wherein the cutter is rotatable about a vertical axis.

In power-driven motors, while it is conventional practice to provide a clutch means between the source of power and the drive wheels thereof, variable speed controls are normally too expensive and complex for such machines, even though such a variable speed control is frequently desirable.

Thus, still a further object of this invention is to provide a simple, but efficient and inexpensive, variable speed control for a power mower or the like.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawings, in which:

FIGURE 1 is a perspective view of a mowing machine embodying the improvements herein disclosed and with the drive motor omitted to show certain parts.

FIGURE 2 is an enlarged, fragmentary, side elevation view, with a frame supporting wheel removed, showing the drive connections and transmissions for the machine of FIGURE 1.

FIGURE 3 is a fragmentary illustration of the telescoping frame means for effecting selective driving connection of the cutter with the drive means therefor, and shows the parts in position when the cutter is not being driven by the belt drive therefor.

FIGURE 4 is similar to FIGURE 3, and shows additional details, and further shows the position of parts when the cutter is being driven by the belt drive therefor.

FIGURES 5 and 6 show two relative positions of the pitch adjustment means for selectively varying the pitch of the cutter relative to the ground upon which the mower is supported, with FIGURE 6 showing the parts when the cutter is at a smaller pitch to the horizontal as compared with FIGURE 5.

FIGURE 7 is an enlarged vertical cross-section view through the variable speed control means of the mower herein disclosed.

Referring now to the drawings, there is illustrated in FIGURE 1 a motor-driven weed mowing machine generally indicated at 10, having a wheel-supported frame including axle means 12, and a pair of ground-engaging support wheels 14 and 16. The frame 18 is positioned below the axle means 12 and is supported, in part, by a link 20, best seen in FIGURES 5 and 6, which connects at one end to the axle means 12 and at the other end to frame 18. The frame 18 is also supported, in part, through the medium of a pitch adjustment means generally indicated at 22, the operation of which will be described hereinafter. A handle means 24 extends rearwardly from the frame 18 and provides a pair of handle bars by means of which the mower 10 may be guided.

Referring now specifically to frame 18, said frame has a forwardly extending portion, or arm, 26 upon which is mounted the cutter head assembly 30 of the mowing machine. The forwardly extending arm 26 of the frame is rigidified by means of a diagonal brace member 28.

The cutter head assembly 30 includes an upright, elongated, tubular bearing 32 which carries a belt guard 33. The upright tubular bearing 32 has a laterally extending tubular projection 34 which is telescopically mounted on the forward end of arm 26. Rotatably mounted in bearing 32 is an elongated shaft 36 having its ends projecting from both ends of the bearing 32. A cutter means 38 is mounted on the lower end of shaft 36 and is arranged for rotation in a plane transverse to the axis of bearing 32. The upper end of shaft 36 has a pulley 40 connected thereto for rotation therewith. The cutter means 38 is driven through the medium of an endless flexible belt 41 which is trained over the driven pulley 40 and which extends rearwardly toward frame 18 where it is driven by power means which will be described hereinafter.

The cutter head assembly 30 includes shield structure generally indicated at 42 and carried on upright tubular bearing 32. The shield structure 42 includes a member 43, which serves in part as a ground support for cutter head 30, and a rearwardly sweeping bar 43a which extends above the shield structure 42 and serves to sweep the cut weeds to one side of the machine. The details of the shield structure 42 form no part of this invention.

The laterally projecting tubular portion 34 of cutter head 30 is provided with a flange 44. Adjustably mounted on the forwardly projecting arm 26 is a hub 46 having a flange 48 which is arranged in facing relation with a portion of flange 44. The flanges 44 and 48 have telescoping parts which are displaced from the axis of the telescoped members 26 and 34 and which operate to prevent relative axial rotation of the telescoped members 26 and 34. More specifically, the flange 48 carries a forwardly projecting finger 50 which extends through and cooperates with a notch 52 in flange 44, and such cooperation maintains the cutter head assembly 30 non-rotative relative to the forwardly projecting arm 26. The hub 46 is provided with one or more set screws 54 which permit of selective retraction of hub 46 along arm 26 from a position adjacent flange 44 and, in the retracted condition, the cutter head assembly 30 "floats" with respect to the forwardly projecting arm 26, that is, it is free to rotate relative to the longitudinal axis of arm 26.

A means CL for selectively causing the clutching and de-clutching of the pulley 40 with power transmission belt 41 is shown in FIGURES 1, 3 and 4, and said means CL includes an elongated articulated actuator mechanism. The actuator mechanism includes an elongated actuator rod 56 which passes through an aperture in flange 44 and is threaded along a portion thereof and which carries a pair of manually adjustable nuts 58 and 60 on the threaded portion of the rod disposed on opposite sides of the upstanding portion of flange 44. The engament of the nuts 58 and 60 with flange 44 will effect movement of the flange 44 and the upright bearing 32 in selected directions axially of the arm 26.

The rearward end of actuator rod 56 is connected to a link 62 which is pivoted on pin 64 carried by brace 28. The actuator mechanism also includes an intermediate link 66, an elongated extension link 68 which connects to link 66 through the means of a threaded portion on link 68 and a pair of adjustment nuts 70 for engagement with link 66. The rearward end of link 68 is pivotally connected to a cam member 72 which is pivoted for rotation about the axis of a pin 74 that connects to and is telescopically received in a tubular shaft 76 of a manual control 78, which is journalled for rotation on frame 18. A pin 73 to which the link 68 is connected is offset from the pivot axis of pin 74. The frame 18 carries an abutment member 80 against which the cam 72 is swung in the position shown in FIGURE 4, and this provides an over-center position which maintains the articulated linkage 68—66—56 in its operative extended position, as seen in FIGURE 4, where the pulley 40 is being driven by belt 41. By merely swinging the handle 78 from the position of FIGURE 4 to the position of FIGURE 3, the cam 72 is swung through the over-center position and to a release position wherein the parts 26 and 34 telescope to the position where flanges 44 and 48, acting as stop means, abut and the belt 41 is no longer in driving relation with pulley 40. The belt guard 33 carried on bearing 32 prevents the belt 41 from moving off the grooved edge of pulley 40.

The foregoing arrangement of parts also provides that the operator may effect clutching and de-clutching of the cutter 8 while in his normal position guiding the mower through handle means 24, since the control handle 78 is carried on frame 18 adjacent the rear end thereof.

Referring now to the drive for the power mower shown in FIGURE 1, the frame 18 carries thereon an internal combustion engine 82 having a drive shaft 84 extending laterally therefrom. The drive shaft 84 carries a double drive pulley 86 over which are trained a pair of drive belts. The first drive belt, belt 41, extends forwardly to be trained over pulley 40 to transmit power to the cutter head 30. The second drive belt shown at 88 transmits power from the engine 82 to the mower's wheels 14 and 16 through a step-down speed transmission. The belt 88 thus transmits power from small diameter pulley 86 to a large pulley 90, which is adapted to rotate with a small pulley 92 about a common axle 94. The smaller pulley 92 then transmits power to a larger pulley 96 by means of belt 98. The pulley 96 rotates with a small sprocket 100 on a common shaft 102, and the sprocket 100 serves to drive a large diameter driven sprocket 104 through chain 106. The driven sprocket 104 is mounted on the axle means 12, and serves to transmit power thereto through the means of a gear differential 108 which is best seen in FIGURE 2.

Pivotally mounted on shaft 102 is a chain-tension means 112 which includes an arm 114 that carries an idling sprocket 116, and the chain-tensioner 112 is spring-biased against the chain 106 to maintain proper tension on the drive chain. A spring-biased belt tensioner is provided for belt 98 and includes an idler pulley 118 carried by an arm 120 that is pivoted on pin 122, and the belt-tensioner is spring-biased toward engagement with belt 98 to provide a tension thereon, and for other purposes that will become apparent hereinafter.

There is provided in the device disclosed herein a novel variable speed control which is best seen in FIGURE 7 and which will now be described. In FIGURE 7 there is shown the drive pulley 90 over which the drive belt 88 is trained. The variable speed control is interposed between the pulleys 90 and 92. As shown, the pulley 90 has a hub 130 connected thereto that is provided with a beveled face 132 and an innermost cylindrical face 133. A second hub 134 is provided having a beveled face 136 and an innermost cylindrical face 136a respectively facing the bevel 132 and cylindrical face 133 on hub 130. The pair of hubs 130 and 134 cooperate to define the driven pulley 92 over which the belt 98 is trained.

The axle 94 on which the pulleys 90 and 92 are rotatably mounted is a hollow one. The hub 130 abuts a thrust bearing 137 carried on axle 94. The hub 134 is splined on axle 94 for slidable movement toward and away from hub 130. Extending through the tubular bearing 94 is an elongated control shaft 138 having a head 140 at one end positioned for engagement with the terminus of a tubular extension 135 of hub 134. The other end of control shaft 138 is threaded and adjustably carries a pair of nuts 144 thereon which serve as abutment means for engaging a thrust bearing 146 which engages a wall 148 of a channel-shaped control arm 150 pivotally mounted on pin 152.

A bell-crank type controller 154 for the control arm 150 is pivoted on pin 156 and has a first portion 157 which engages the control arm 150 for actuation thereof, and which has another portion thereof connected to an elongated control cable 158 that extends to a pivotally mounted manual actuator 160 carried on the hand grip portion of the handle means 24.

The entire speed control is adjustably mountable as a unit on the deck of frame 18 and includes an L-shaped bracket 161, for securement to frame 18, an inclined plate 162, sleeve means 163, and another inclined plate 164, all of which are welded integral to provide rigid construction. The pin 152 is pivoted in plate 162, pin 156 is pivoted in plate 164, and axle 94 is journalled in sleeve means 163.

It will be seen that an operator has ready control of the forward movement of mower 10 merely through manual actuator 160, for by pulling on cable 158 the hub 134 is brought closer to hub 132 and this varies the distance therebetween, so as to provide a range of peripheral speeds for belt 98 relative to the peripheral speed of pulley 90. Thus, the tighter one pulls on cable 158, the faster the machine will go, and, upon relaxing, the machine will go slower, because the spring-biased idler wheel 118 forces the V-belt 98 toward a smaller radial contact with the beveled walls 132 and 136 of the pulley 92. When the cable 158 is fully released, the spring-biased idler pulley 118 will cause the hubs 130 and 134 to move apart so that belt 98 enters between cylindrical walls 133 and 136a and there then will be a de-clutching of the wheels 14 and 16 from the power transmission, thereby providing not only a variable speed control but also clutching and de-clutching control between the power means and the drive means of the power mower.

With respect to the pitch adjustment of the cutter blades 38, reference is had to FIGURES 5 and 6, where it is seen that the mower's frame 18 is supported below the axle means 12 both through the medium of link 20 extending rearwardly of axle means 12, and through the medium of the adjusting means 22 extending forwardly of axle means 12. The link 20 is pivotally connected at one end to the axle means 12 and pivotally connected at its other end through pin 170 to the frame 18. The frame 18 also provides a forwardly extending lateral abutment 172 which is located forwardly of the axle means 12 and has an aperture 173 for receiving an upright member therethrough. There is provided a crank means, generally indicated at 174, which includes a threaded stem 176, an enlarged shank 178 on the stem in bearing engagement with the under side of abutment 172, and an offset handle 180 for effecting a rotary motion of the stem 176. A movable abutment 182 is provided having a rearwardly extending flange 184 which rests on axle 12 and a downwardly extending hook 186 which hooks rearwardly against the axle means 12, thereby providing support for the frame 18. The flange 184 carries a nut 188 which receives threaded stem 176 to effect relative movement therebetween. Alternatively, the abutment 182 may be welded to a tubular sleeve 12a through which the axle 12 extends.

By actuating the crank means 174, the abutments 172 and 182 may be selectively brought closer together or separated. When closer together, as seen in FIGURE 6, the pitch of the cutter blades 38 relative to the ground is reduced, and when the abutments 172 and 182 are further apart, as seen in FIGURE 5, then the pitch of the blades 38 relative to the ground is increased.

In order to obtain access to the pitch control, it is desirable to stop the mower, because the person effecting the pitch adjustment must position himself forwardly of the wheels of the device and reach under the frame to obtain access to the handle 180. However, the desirablity of this system lies in the fact that it is very simple, that the length of the pitch-adjusting crank stem 176 is relatively short, and the adjustment means also serves in part to support the frame 18 below the axle means 12, thereby providing a dual function for that structure.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new, and desire to secure by Letters Patent of the United States, is:

1. A mowing machine comprising a wheel supported frame, an elongated support member projecting forwardly from said frame, an elongated bearing disposed so that its axis extends transversely to the longitudinal axis of said support member and having a tubular lateral projection telescopically and pivotably mounted on the forward end of said support member to afford having the elongated bearing float relative to said support member, an elongated shaft mounted in said bearing and having its ends projecting from both ends of said bearing, cutter means on one end of said shaft for rotation in a plane transverse to the axis of said bearing, a driven pulley on the other end of said shaft, a drive pulley on said frame, endless belt transmission means trained over said drive pulley and driven pulley, power means driving said drive pulley, clutch control means carried on said frame for selectively moving said drive pulley and driven pulley toward each other, to selectively de-clutch the cutter means from the drive pulley, or for moving said pulleys apart, to selectively effect an operative drive therebetween through the medium of the belt transmission means, stop flanges carried on said telescoping support member and on said tubular lateral projection of the bearing, said stop flanges being positioned and arranged to engage each other to limit movement of said pulleys toward each other, and telescoping attitude-maintaining elements on said stop flanges offset from and parallel to the axis of said support member for maintaining said bearing at an upright attitude.

2. A mowing machine comprising, in combination, a wheel supported frame, an elongated support member projecting forwardly from said frame, an elongated bearing disposed so that its axis extends transversely to the longitudinal axis of said support member and having a tubular lateral projection telescopically and pivotably mounted on the forward end of said support member to afford having the elongated bearing float relative to said support member, an elongated shaft mounted in said bearing and having its ends projecting from both ends of said bearing, cutter means on one end of said shaft for rotation in a plane transverse to the axis of said bearing, a driven pulley on the other end of said shaft, a drive pulley on said frame, endless belt transmission means trained over said drive pulley and driven pulley, power means driving said drive pulley, clutch control means carried on said frame for selectively moving said drive pulley and driven pulley toward each other, to selectively de-clutch the cutter means from the drive pulley, or for moving said pulleys apart, to selectively effect an operative drive therebetween through the medium of the belt transmission means, and telescoped attitude maintaining elements on said support member and tubular lateral projection including a notch-defining collar and an elongated finger parallel to said support member and slidably extending through the notch in said collar, said telescoped attitude-maintaining elements being offset from the axis of said telescoped support member and tubular lateral projection and cooperating to maintain said bearing at an upright attitude.

References Cited in the file of this patent

UNITED STATES PATENTS

| | | |
|---|---|---|
| 2,359,358 | Dielschneider | Oct. 3, 1944 |
| 2,490,870 | Heyn | Dec. 13, 1949 |
| 2,618,919 | Hutchens | Nov. 25, 1952 |
| 2,689,620 | Hainke | Sept. 21, 1954 |
| 2,708,484 | Hoffman | May 17, 1955 |
| 2,736,350 | Hill et al. | Feb. 28, 1956 |
| 2,776,844 | Wilkin | Jan. 8, 1957 |
| 2,805,536 | Harnett | Sept. 10, 1957 |
| 2,818,270 | Cataline | Dec. 31, 1957 |
| 2,855,742 | Cooper et al. | Oct. 14, 1958 |
| 2,909,021 | McLane | Oct. 20, 1959 |